INVENTOR.
Charles B. Spase
BY Fay, Oberlin & Fay
ATTORNEYS.

Patented July 19, 1938

2,124,013

UNITED STATES PATENT OFFICE 2,124,013

CLUTCH PLATE

Charles B. Spase, Syracuse, N. Y., assignor to Ira Saks, Cleveland, Ohio

Application October 5, 1936, Serial No. 104,033

9 Claims. (Cl. 192—68)

The present invention relating as indicated to a clutch plate has particular reference to a cushion center clutch plate in which a plurality of circularly disposed coil springs, connected between the hub and the body of the plate, are employed for the purpose of imparting yieldable movement between the hub and the disc when torque is transmitted through the clutch plate.

The general object and nature of my invention is to provide such a cushion center type of clutch plate wherein chafing, rubbing and frictional wear of the moving parts is minimized; wherein the durability and strength of the plate is increased and strain on the individual parts is reduced.

One of the specific objects of my invention is to provide a clutch plate construction wherein the coil springs and the driven element, viz., the hub flange, are separated from and out of contact with the body of the clutch disc.

Still another object is to provide a stop lug ring for limiting the maximum movement of the hub with respect to the disc and wherein such ring is anchored to the disc at the most convenient point furthest removed from the center of the plate whereby torque and load shocks transmitted through the clutch plate will produce a minimum of strain in the body of the clutch disc; and also to so construct such stop lug ring whereby the projecting lugs are in alignment with the rivet or fastener holes passing through such ring, thus compensating for any weakening in the cross-sectional strength of the ring.

Still another object of the invention is to provide a protective enclosure or housing for the coil springs, so located and formed as to prevent broken springs from working out of place and flying off into the flywheel or other parts of the clutch assembly.

And yet another object is to provide a construction wherein sufficient clearance is provided between the coil springs and adjacent parts so as to accommodate expansion of the diameter thereof when they are subjected to compression.

Figure 1:
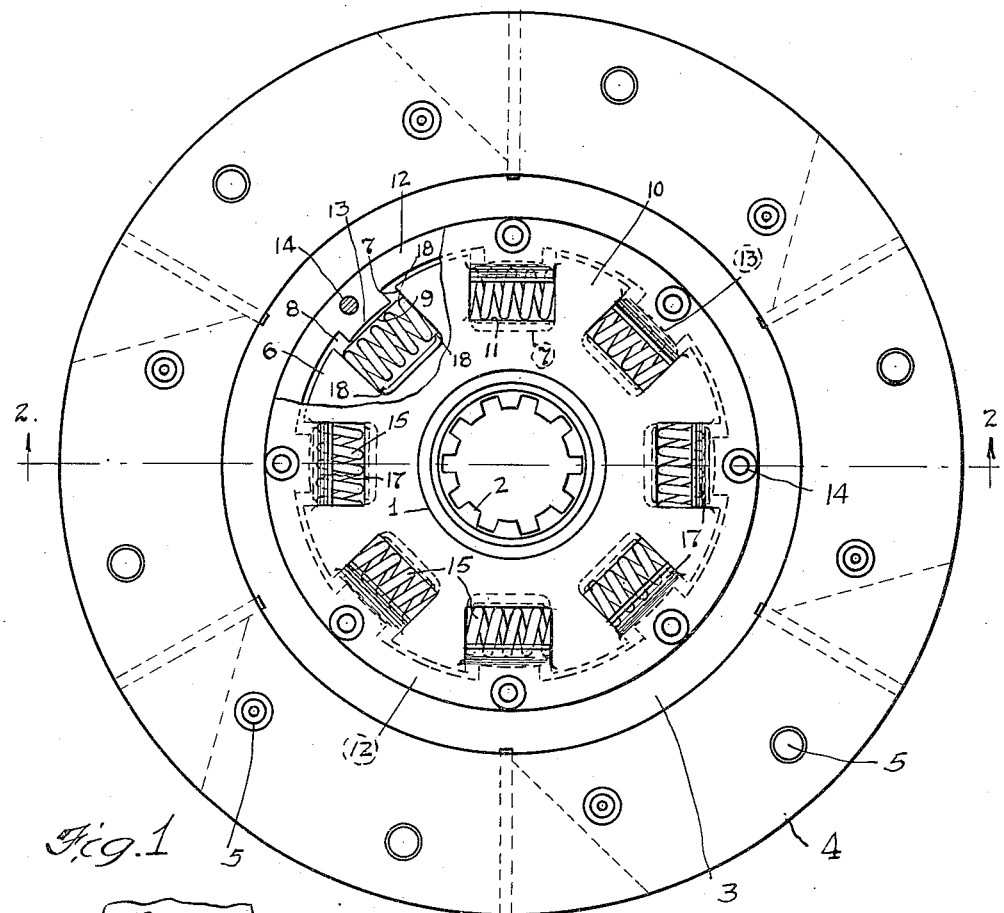
Figure 3:
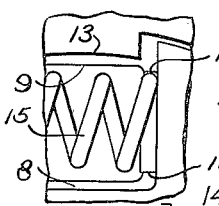
Figure 2:
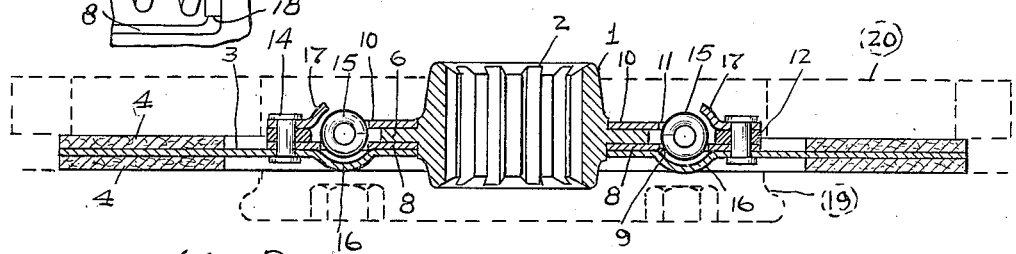

Fig. 1 is a plan view of the clutch plate embodying the principles of my invention; Fig. 2 is a transverse sectional view of Fig. 1 and taken substantially along line 2—2 thereof, and Fig. 3 is an enlarged detail view illustrating the construction of the coil spring holding shoulders.

Now referring more particularly to the drawing, there is shown therein a hub 1 having the spline teeth 2 for engagement with the driven shaft of a clutch assembly. A clutch disc 3 is movably or rotatably mounted with respect to the hub 1 and carries the friction facing rings 4—4 secured thereto by the rivets 5.

The hub 1 has a radially extending flange 6 in which there are a plurality of slots 7 extending inwardly from the outer circumference of the flange. A ring or abutment plate 8 contacts one side of the flange 6 and is carried by the clutch disc 3. There are a plurality of openings 9 in the abutment plate 8 which are normally in registration with the slots 7 in the hub flange 6.

A second plate, termed a cover plate 10, contacts and overlies the side of the hub flange 6 opposite to that side upon which the abutment plate 8 is located. The cover plate 10 is also carried by the clutch disc 3 and has openings 11 whose ends and innermost sides are in registry with the corresponding ends and sides of the openings 9.

A combined spacer and stop lug ring 12 is positioned between the abutment plate 8 and the cover plate 10, and has a plurality of inward projections or lugs 13 which extend into the slots 7 in the hub flange 6. Suitable fasteners such as the rivets 14 extend through the spacer and lug ring 12 at points in radial alignment with the center of the stop lugs 13. Thus it will be seen that the fastener openings in the ring 12 are located at the points of maximum cross-sectional thickness of the latter and thereby any possibility of weakening the strength of the ring 12 is eliminated.

A plurality of coil springs 15 are positioned in the openings 9 and 11 of the abutment plate 8 and cover plate 10 respectively, and also in the slots 7 in the hub flange 6. The ends of the springs contact the end walls of the openings 9 and 11 and of the slots 7. Depressions or sumps 16 are provided in the body of the clutch disc 3 at points adjacent the location of the coil springs 15 and are spaced therefrom. The depressed or deformed portions 16 of the clutch disc 3 thus serve as enclosing housings around substantially one-half of the coil springs 15, and prevent the latter, in the event of breakage or working loose from their anchorage, from passing through to the opposite side of the clutch disc 3. A plurality of guard portions 17 extend from the cover plate 10 along the outer side of the openings 11. The guards 17 are also spaced from the coil springs 15 and serve as a partial housing which prevents the springs 15 or broken parts thereof from flying off in a centrifugal direction into the flywheel or other portions of the clutch assembly.

Directing attention specifically to Fig. 1, there are relatively short shoulders 18 located at the juncture of the sides and ends of the openings 9 in the abutment plate 8. The length of the shoulders 18 corresponds substantially to the width of the end turns of the coil springs 15, or, in other words, to the width of the spring stock of the coil springs 15. It will also be seen that the shoulders 18 on opposing sides of the opening 9 are spaced apart a distance equal to the normal diameter of the coil springs 15. In this manner the shoulders 18 operate as means for definitely locating and maintaining the coil springs 15 in position in the slots 7 and openings 9 and 11. It will be seen that the side walls, or the inner and outer circumferentially extending sides, of the slots 7 and the side walls of the openings 11, and the remaining portions of the side walls of the openings 9 (i. e., with the exception of the shoulders 18) are spaced from the coil springs 15 and thus these parts do not normally contact so that the springs are free to expand in diameter upon compression, and any rubbing or chafing during operation of the springs is eliminated. The coil springs 15 are thus in effect mounted in "floating" relationship, with respect to adjacent parts of the clutch plate.

Torque normally transmitted to the hub 1 from the clutch disc 3 passes first through the rivets 14, to the end walls of the openings in the plates 8 and 10, to the coil springs 15, to the flange 6. Since the rivets 14 are located at a substantial distance from the center of the driven element, viz., the hub 1, and at the furthest distance from the center, as conveniently allowed by relationship to other parts of the clutch assembly such as the flywheel 19 or pressure plate 20 (as indicated in dotted lines in Fig. 2), the stress per unit area of the torque transmitted through the body of the clutch disc 3 is minimized. In other words, the power transmitting connection between the body of the disc 3 and the remainder of the parts of the clutch assembly is located at a point of maximum mechanical advantage as permitted by the location of adjacent parts. The stress and strain on the body of the disc 3 being reduced, the disc will thus have a corresponding greater life and durability.

Similarly, it will be seen that torque ultimately transmitted to the stop lugs 13 from the hub flange 6 is also delivered to the clutch disc 3 at a point where the stress per unit area on the disc will be minimized.

Other modes of applying the principle of my invention may be employed instead of the one explained, change being made as regards the mechanism herein disclosed, provided, the means stated by any of the following claims or the equivalent of such stated means be employed.

I therefore particularly point out and distinctly claim as my invention:—

1. In a clutch plate, the combination of a disc, a hub rotatably mounted with respect to said disc, a flange on said hub, an abutment plate carried by and laying against said disc between said disc and said flange, said flange and said abutment plate having registering openings, and coil springs mounted in said openings, the body of said disc having depressions, enclosing one side of said springs in closely spaced relationship.

2. In a clutch plate, the combination of a disc, a hub rotatably mounted with respect to said disc, a slotted flange on said hub, an abutment plate carried by said disc, said abutment plate having openings in registry with the slots in said flange, spring elements mounted between the ends of the openings in said abutment plate and the ends of the slots in said flange, a ring carried by said disc, and a plurality of projections on said ring extending inwardly into said slots.

3. In a clutch plate, the combination of a disc, a hub rotatably mounted with respect to said disc, a slotted flange on said hub, an abutment plate carried by said disc, said abutment plate having openings in registry with the slots in said flange, spring elements mounted between the ends of the openings in said abutment plate and the ends of the slots in said flange, a ring carried by said disc, a plurality of projections on said ring extending inwardly into said slots, and fasteners for securing said ring to said disc, said fasteners passing through said ring at points in radial alignment with said projections.

4. In a clutch plate, the combination of a disc, a hub rotatably mounted with respect to said disc, a slotted flange on said hub, the inner portion of said disc being co-extensive with said flange, an abutment plate carried by and laying against said disc between said disc and said flange, said abutment plate having openings in registry with the slots in said flange, spring elements mounted between the ends of the openings in said abutment plate and the ends of the slots in said flange, and a cover plate also carried by said disc and overlying said flange, said cover plate having openings in registry with the slots in said flange and with the openings in said abutment plate, said springs also engaging with the ends of the openings in said cover plate.

5. In a clutch plate, the combination of a disc, a hub rotatably mounted with respect to said disc, a slotted flange on said hub, an abutment plate carried by said disc, said abutment plate having openings in registry with the slots in said flange, spring elements mounted between the ends of the openings in said abutment plate and the ends of the slots in said flange, and shoulders at the juncture of the sides and ends of said openings contacting the end turns only of said coil springs, the remaining portion of said sides and the sides of said slots being spaced from said springs to accommodate expansion of the diameter of the latter.

6. In a clutch plate, the combination of a disc, a hub rotatably mounted with respect to said disc, a slotted flange on said hub, the inner portion of said disc being co-extensive with said flange, an abutment plate carried by and laying against said disc between said disc and flange, said abutment plate having openings in registry with the slots in said flange, spring elements mounted between the ends of the openings in said abutment plate and the ends of the slots in said flange, a cover plate also carried by said disc and overlying said flange, said cover plate having openings in registry with the slots in said flange and with the openings in said abutment plate, said springs also engaging with the ends of the openings in said cover plate, and portions of said cover plate along the outer sides of said openings therein overlying said springs in spaced relationship.

7. In a clutch plate, the combination of a disc, a hub rotatably mounted with respect to said disc, a slotted flange on said hub, an abutment plate carried by and laying against said disc, said abutment plate having openings in registry with the slots in said flange, spring elements mounted between the ends of the openings in said abutment plate and the ends of the slots in said flange, a cover plate also carried by said disc and overlying said flange, said cover plate having openings in registry with the slots in said flange and with the openings in said abutment plate, said springs also engaging with the ends of the openings in said cover plate, and a spacer ring mounted between said abutment plate and said cover plate.

8. In a clutch plate, the combination of a disc, a hub rotatably mounted with respect to said disc, a slotted flange on said hub, an abutment plate carried by said disc, said abutment plate having openings in registry with the slots in said flange, spring elements mounted between the ends of the openings in said abutment plate and the ends of the slots in said flange, a cover plate also carried by said disc and overlying said flange, a ring spacing said cover plate from said abutment plate, said cover plate having openings in registry with the slots in said flange and with the openings in said abutment plate, said springs also engaging with the ends of the openings in said cover plate, and a plurality of projections on said ring extending inwardly into said slots.

9. In a clutch plate, the combination of a disc, a hub rotatably mounted with respect to said disc, a slotted flange on said hub, an abutment plate carried by said disc, said abutment plate having openings in registry with the slots in said flange, spring elements mounted between the ends of the openings in said abutment plate and the ends of the slots in said flange, a cover plate also carried by said disc and overlying said flange, a ring spacing said cover plate from said abutment plate, said cover plate having openings in registry with the slots in said flange and with the openings in said abutment plate, said springs also engaging with the ends of the openings in said cover plate, a plurality of projections on said ring extending inwardly into said slots, and fasteners for securing said ring, said cover plate and said abutment plate to said disc, said fasteners extending through said ring at points in radial alignment with said projections.

CHARLES B. SPASE.